(12) United States Patent
Jenkins

(10) Patent No.: US 6,752,876 B2
(45) Date of Patent: Jun. 22, 2004

(54) SYSTEM AND METHOD FOR EXTRACTING CONTAMINANTS FROM ROTATING ELECTRICAL DEVICES

(75) Inventor: Maurice A. Jenkins, Casselberry, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 317 days.

(21) Appl. No.: 10/094,729

(22) Filed: Mar. 11, 2002

(65) Prior Publication Data
US 2003/0168083 A1 Sep. 11, 2003

(51) Int. Cl.[7] ................................................ B08B 5/04
(52) U.S. Cl. .............................. 134/21; 15/301; 15/314
(58) Field of Search ........................ 15/300.1, 301, 15/314, 315; 134/21

(56) References Cited

U.S. PATENT DOCUMENTS

| | | | | |
|---|---|---|---|---|
| 3,969,785 A | * | 7/1976 | Ogawa et al. | 15/301 |
| 4,093,369 A | * | 6/1978 | Hewitt | 399/355 |
| 4,666,282 A | * | 5/1987 | Rowe | 399/93 |
| 5,594,972 A | * | 1/1997 | Iversen | 15/301 |
| 6,137,861 A | * | 10/2000 | Reina et al. | 378/174 |
| 2002/0013974 A1 | * | 2/2002 | Gibson et al. | 15/315 |

* cited by examiner

Primary Examiner—Terrence R. Till

(57) ABSTRACT

A vacuum extraction system is provided for extracting contaminants from rotating electrical devices. In an exemplary embodiment, the vacuum extraction system extracts conductive dust from the current collection system of a synchronous generator with a static excitation system. As the brushes (24) of the static excitation system wear against the collector rings (26), they produce conductive dust, which if permitted to accumulate, may cause electrical shorts and arcing and severe damage to the rotating electrical device. Methods and systems consistent with the vacuum extraction system of the present invention extract conductive dust from a rotating electrical device through vacuum passages (50, 62, 67, 72, 77) in the rotating electrical device into a removable dust capture media (46) to prevent dust accumulation and possible electrical damage. The vacuum passages of the vacuum extraction system may comprise, for example, nozzles (50), through-holes (62) in a brush (60), grooves (67) in a brush (65), through-holes (72) in a brush holder (70), or grooves (77) in a brush holder (75).

19 Claims, 5 Drawing Sheets

SYSTEM AND METHOD FOR EXTRACTING CONTAMINANTS FROM ROTATING ELECTRICAL DEVICES

FIELD OF THE INVENTION

The present invention relates to systems and methods for extracting contaminants from rotating electrical devices, and more particularly to systems and methods for vacuum extracting brush contaminants from synchronous generators.

BACKGROUND OF THE INVENTION

Rotating electrical devices such as generators and motors often utilize wearable, conductive components referred to as brushes to transfer electricity from rotating parts to stationary parts. One example of such a rotating electrical device is the type of synchronous generator used in the power generation industry.

In the power generation industry, synchronous generators are used to convert rotary mechanical energy supplied by a power source such as a steam or combustion turbine or a nuclear reactor into electrical energy. Such synchronous generators generally comprise two main sections: a rotor and a stator. The rotor is typically wound with conductors called field windings. The field windings are made up of straight sections that run the length of the rotor and end sections that connect the straight sections into one long conductor. The stator is also typically wound with conductors called stator windings.

When rotary mechanical energy causes the rotor of the synchronous generator to spin, the field windings turn inside of the stator windings. If the field windings are supplied with an excitation current, the field windings produce a magnetic flux that induces an electric current in the stator windings as they turn inside of the stator windings.

One conventional method for supplying excitation current to field windings is called static excitation. In static excitation systems, a current collection system is used to transfer excitation current from an exciter to the field windings on the spinning rotor. The current collection system includes a set collector rings and a set of corresponding brushes. The collector rings are mounted to the circumference of the rotor and are electrically connected to the field windings. The brushes, which are generally made of a wearable, conductive material such as carbon or graphite, are held in sliding contact with corresponding collector rings to form a sliding, electrical connection to the field windings on the spinning rotor.

A significant disadvantage of such static excitation systems is that the brushes they utilize wear over time as they slide against the collector rings and must periodically be replaced. In addition, as the brushes wear, they produce a conductive dust as a contaminant byproduct, which if permitted to accumulate may cause electrical shorts or arcing. Such electrical shorts or arcing can cause severe damage to electrical devices.

In the power generation industry, in order to prevent damage from electrical shorts or arcing, equipment operators are required to frequently inspect and clean the current collection systems of generators. This daily inspection and cleaning is tedious and time consuming. It also exposes equipment operators to dangerous high-voltage conditions in and around the current collection system.

Methods and systems consistent with the present invention provide a vacuum extraction system that automatically extracts contamination produced by wearable brushes or other wearable components in rotating electrical devices. The vacuum extraction system substantially reduces the frequency with which inspections and cleanings are required, which reduces the operating costs of the rotating electrical devices. By reducing the frequency with which inspection and cleanings are required, the vacuum extraction system also reduces the frequency with which operators are exposed to dangerous high-voltage conditions. In addition, the vacuum extraction system produces increased air flow in and around the current collection system, which cools and extends the life of the components of the current collection system.

SUMMARY OF THE INVENTION

Systems and methods consistent with the present invention provide a dust extraction system for extracting contamination from rotating electrical devices. Consistent with one embodiment of the present invention, a vacuum extraction system is provided for extracting dust from a current collection system. The vacuum extraction system comprises a brush holder assembly comprising a brush holder for holding a brush in sliding contact with a collector ring, a vacuum passage for extracting air and contaminants from said current collection system, a dust capture media in vacuum connection with said vacuum passage for capturing contaminants from said air, and a vacuum source in vacuum connection with said dust capture media for supplying vacuum to said vacuum extraction system. Consistent with another embodiment of the present invention, a method of extracting contaminants is provided from a current collection system utilizing a brush in sliding contact with a collector ring. The method comprises the steps of providing a vacuum passage proximate the contact area between said brush and said collector ring, connecting said vacuum passage to a dust capture media via a vacuum connection, connecting said dust capture media to a vacuum source for providing a vacuum at said vacuum passage, and extracting said contaminants away from said contact area via said vacuum into said dust capture media.

Consistent with another embodiment of the present invention a synchronous generator utilizing an excitation current from an exciter is provided. The generator comprises a stator having stator windings; a rotor rotatable within said stator and having field windings for inducing a current in said stator windings; a current collection system for transferring said excitation current from said exciter to said field windings; a vacuum extraction system for extracting dust from said current collection system, said vacuum extraction system comprising a brush holder assembly that comprises a brush holder for holding a brush in sliding, contact with a collector ring, a vacuum passage for extracting air and contaminants from said current collection system, a dust capture media in vacuum connection with said vacuum passage for capturing contaminants from said air, and a vacuum source in vacuum connection with said dust capture media for supplying vacuum to said vacuum extraction system.

DETAILED DESCRIPTION OF THE INVENTION

The following description of a vacuum extraction system consistent with the present invention is made in the context of a synchronous generator. However, it will be clear to one of skill in the art that vacuum extraction systems consistent with the present invention may be applied to any rotating electrical device that utilizes wearable components.

Figure 1:
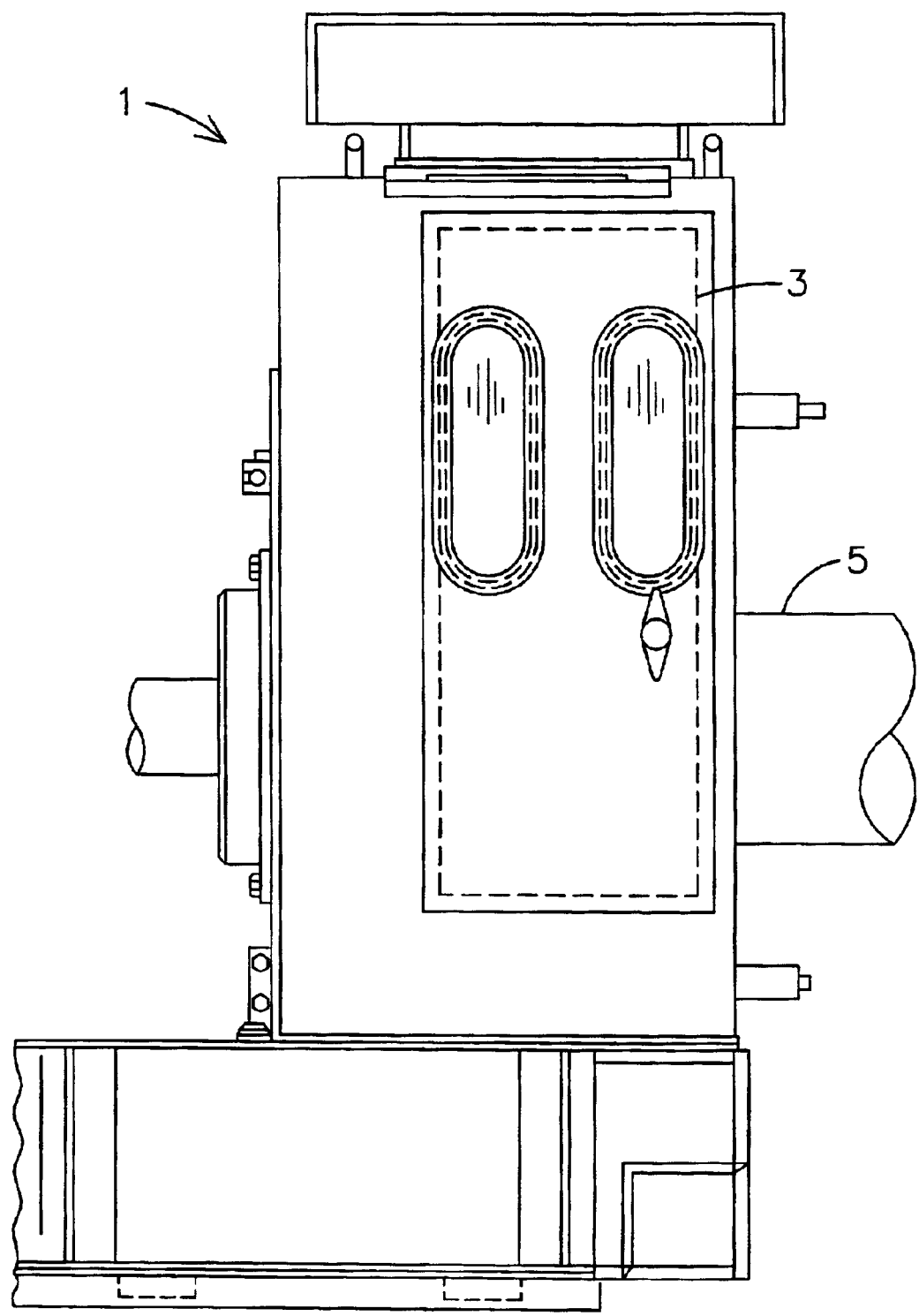
FIG. 1 illustrates a side view of a conventional generator collector housing.
Figure 2:
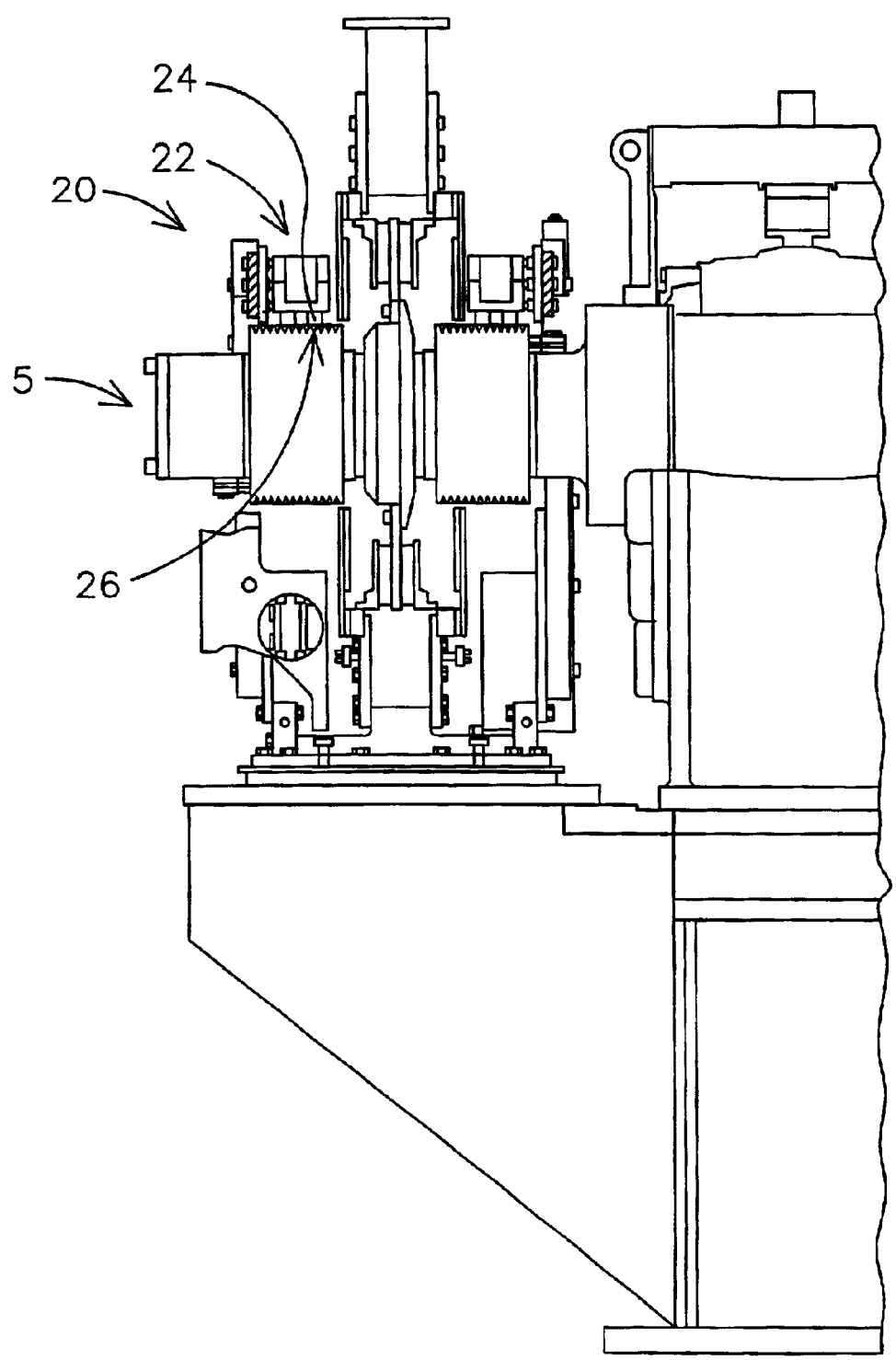
FIG. 2 illustrates a side view of a conventional current collection system inside of the collector housing illustrated in FIG. 1.
Figure 3:
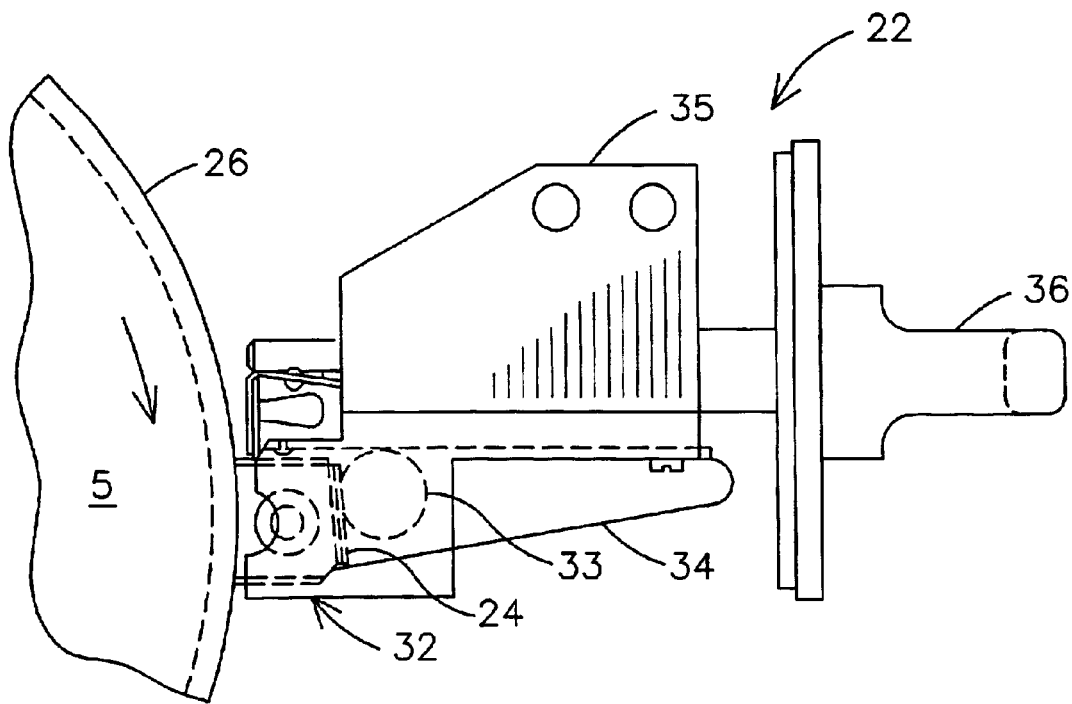
FIG. 3 illustrates an enlarged view of the current collection system of FIG. 2.

FIGS. 1 through 3 illustrate components of a conventional synchronous generator that are suitable for adaptation for use with a vacuum extraction system consistent with the present invention. FIG. 1 illustrates a conventional collector housing 1. The collector housing 1 may be, for example, a steel enclosure. The collector housing 1 covers and surrounds a current collection system, which transfers excitation current from an exciter to field windings on the rotor 5 of the synchronous generator. The collector housing 1 protects the current collection system from damage and prevents passersby from accidentally coming into contact with the high-voltage components of the current collection system. The collector housing is also typically provided with an access door 3 to permit operators to gain access to the inside of the collector housing 1 to clean and maintain the components of the current collection system.

FIG. 2 illustrates a conventional current collection system 20 located inside of the collector housing illustrated in FIG. 1. The current collection system includes brush assembly modules 22 that support brushes 24 that are in sliding, electrical contact with collector rings 26 mounted to the rotor 5. This configuration of brushes 24 and collector rings 26 creates an electrical path from the exciter (not shown) to the spinning rotor 5 of the generator.

FIG. 3 illustrates an enlarged view of the conventional current collection system of FIG. 2. The current collection system includes a brush assembly module 22. The brush assembly module 22 contains the various components that support the brushes 24 against the collector rings 26 to create the sliding, electrical contact necessary to transfer excitation current to the field windings. The brush assembly module 22 includes a brush holder 32, a constant-force spring 33, a copper wire shunt 34, and a module base 35. A module handle 36 may also be provided to facilitate the removal of the brush module assembly 22 from the current collection system for cleaning and maintenance.

The brush 24 fits in a hollow section in the brush holder 32 and is guided by the hollow section so that it stays in sliding, electrical contact with a corresponding collector ring 26. Over time, as the brush 24 slides against the collector ring 26, the brush 24 wears and shrinks in size. As the brush 24 shrinks in size, the constant-force spring 33 exerts a force on the brush 24 to keep the brush 24 in sliding, electrical contact with its corresponding collector ring 26. The brush 24 is also electrically connected to the module base 35 via a copper wire shunt 34. The copper wire shunt 34 is fastened to both the brush 24 and the module base 35 to form an electrical path between the brush 24 and the module base 35. The shunt 34 creates an electrical connection between the brush 24 and the module base 35 and should be sufficiently flexible and sufficiently long to permit the brush 24 to move in the hollow section of the brush holder 32 as the brush 24 wears. The module base 35 is electrically connected to an exciter (not shown), which acts as a source of direct current (dc) excitation current. The above described components thus form a complete electrical path from the exciter to the field windings on the spinning rotor.

Figure 4:
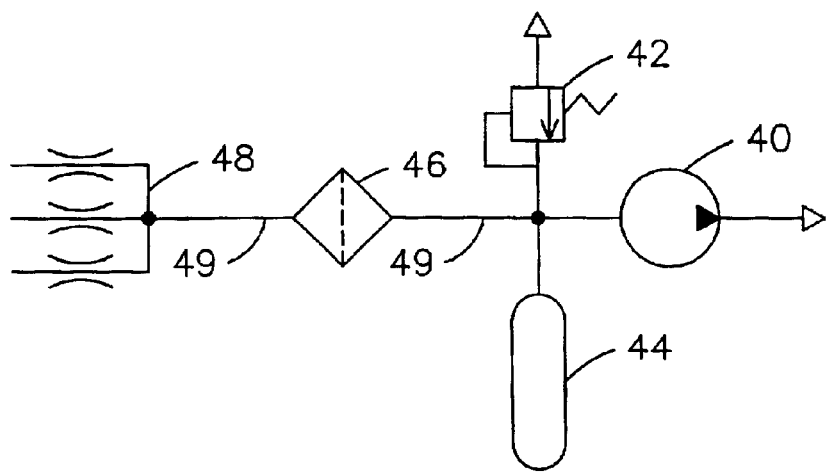
FIG. 4 illustrates an overview of a vacuum extraction system consistent with the present invention.

FIG. 4 illustrates an overview of a vacuum extraction system consistent with the present invention. The vacuum extraction system may include, for example, a vacuum pump 40, a vacuum relief valve 42, a vacuum accumulator 44, a disposable dust capture media 46, orifices 48, and vacuum tubing 49. The vacuum pump 40 acts as a source of vacuum for the vacuum extraction system and may be of a number of different design types—such as a reciprocating piston pump, a diaphragm pump, a rocking piston pump, a rotary vane pump, a rotary screw pump, a centrifugal pump, or a regenerative blower—but should be capable of generating sufficient vacuum to extract unwanted contaminants from the generator. A vacuum relief valve 42 may be included to limit the maximum level of vacuum in the vacuum extraction system to protect the components of the vacuum extraction system from damage. A vacuum accumulator 44 may be included to serve as a vacuum reservoir to help stabilize the level of vacuum in the vacuum extraction system. A disposable dust capture media 46 is included to serve as a filter to remove contaminants from the vacuum stream before the contaminants reach the vacuum pump 40. Orifices 48 are included as the point of entry for the contaminants into the vacuum extraction system. The orifices 48 also restrict airflow into the vacuum extraction system so that a suitable level of vacuum is maintained in the vacuum extraction system. As will be described in greater detail below with reference to FIGS. 5 through 8, the orifices 48 may comprise, for example, nozzles, through-holes in a brush, grooves in a brush, through-holes in a brush holder, or grooves in a brush holder. The vacuum tubing 49 may be any hose, tubing, or piping suitable for conducting vacuum and is preferably non-conductive. The vacuum tubing 49 acts as a vacuum conductor to conduct vacuum from the vacuum pump 40 to the orifices 48, so that contaminants may be extracted from an area near the orifices 48 to the removable dust capture media 46 for subsequent removal from the vacuum extraction system. The size and rating of the various components of the vacuum extraction system should be selected based upon factors such as the distance from the vacuum pump to the orifices, the number and size of the orifices, and the level of vacuum required to effectively extract contaminants. Additional guidance on the sizing and selection of components suitable for use in the vacuum extraction system of the present invention is found in the Gast Manufacturing Company, "Vacuum and Pressure Systems Handbook" (1986), which is incorporated by reference herein in its entirety.

Figure 5:
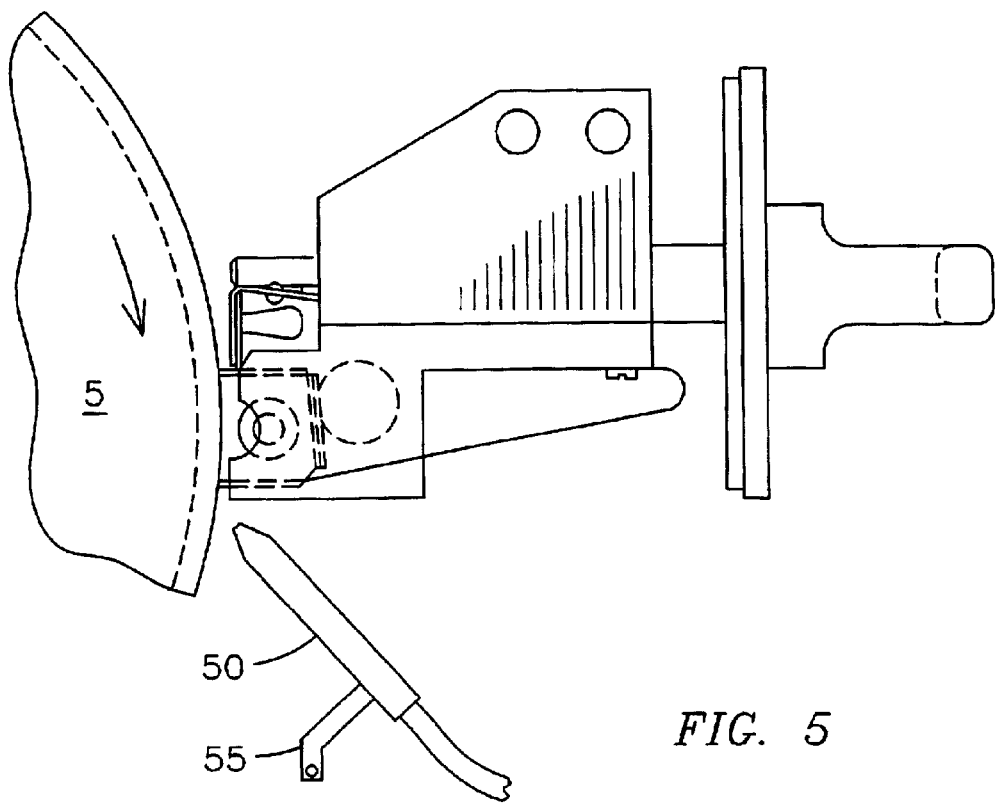
FIG. 5 illustrates an enlarged view of a current collection system consistent with a first embodiment of the present invention.

FIG. 5 illustrates a first embodiment of the vacuum extraction system of the present invention. The vacuum extraction system includes a vacuum extraction nozzle 50 for extracting vacuum and contaminants away from the current collection system. The nozzle 50 may be mounted, for example, near the contact area between a brush and a corresponding collector ring to facilitate extraction of contamination generated by the wearing of the brush against the corresponding collector ring. The spacing between the nozzle 50 and the current-carrying components of the current collection system should be selected based on the operating-voltage levels of the rotor in order to ensure that flashover between the nozzle 50 and current-carrying components does not occur. The nozzle 50 may be held in place by supports 55 fixed to a rigid structure within the collector housing. The nozzle 50 and the supports 55 are preferably constructed of an anti-static, non-conductive material that is capable of withstanding temperatures near 150 degrees Fahrenheit within the collector housing, such as polytetrafluoroethylene (PTFE).

Figure 6A:
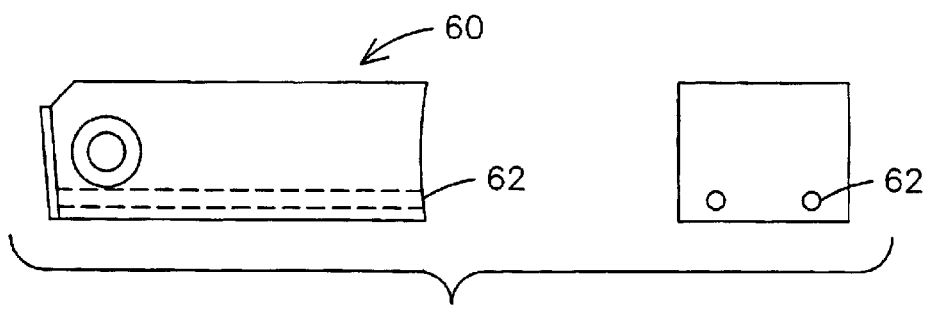
FIGS. 6A & 6B illustrate brushes consistent with a second embodiment of the present invention.
Figure 6B:
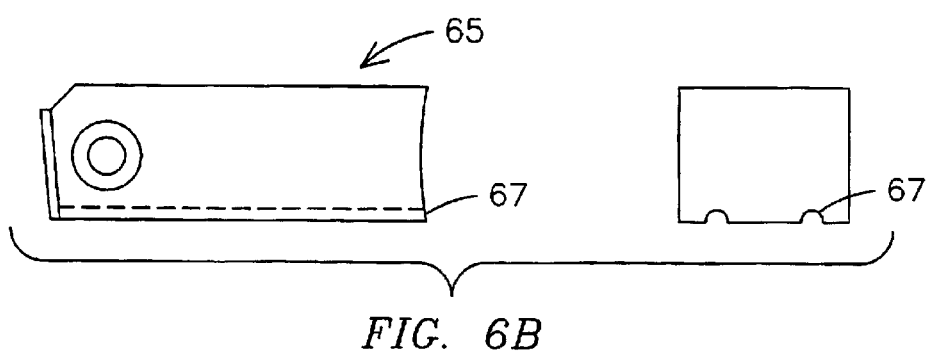

FIGS. 6A and 6B illustrate a second embodiment of the vacuum extraction system of the present invention. The vacuum extraction system includes brushes with passages provided in or on an outer edge of the brushes as a passage through which contamination may be extracted. FIG. 6A illustrates a brush 60 with a passage 62 in the form of a through-hole in the body of the brush 60. The through-hole 62 may be formed, for example, by drilling or otherwise machining a hole through a conventional brush or by providing a hole in the body of the brush during the manufacturing of the brush. FIG. 6B illustrates a brush 65 with a passage 67 in the form of a groove along a side of the body of the brush 65. The groove 67 may be formed, for example, by machining a groove along the side of a conventional brush or by providing a grove in the body of the brush during manufacturing.

The through-holes and notches illustrated in FIGS. 6A and 6B serve as vacuum passages to facilitate extraction of contamination generated by the wearing of a brush against a corresponding collector ring. The through-holes and notches may be used separately or in combination and may also be used with the nozzle illustrated in FIG. 5.

Figure 7A:
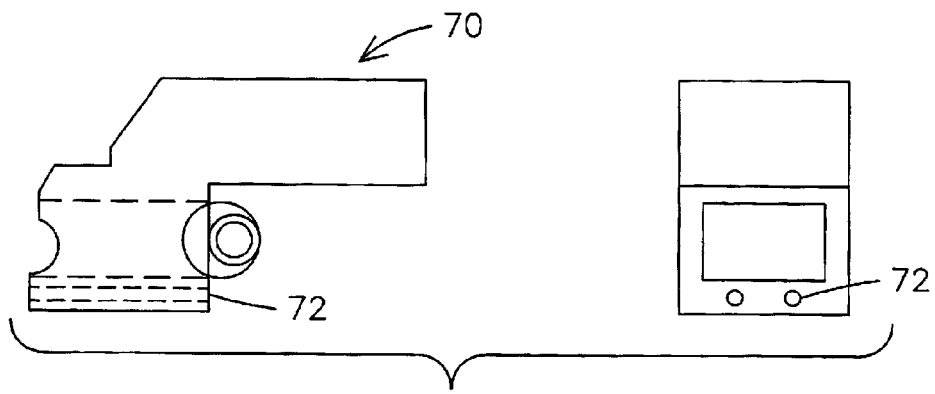
FIGS. 7A and 7B illustrate brush holders consistent with a third embodiment of the present invention.
Figure 7B:
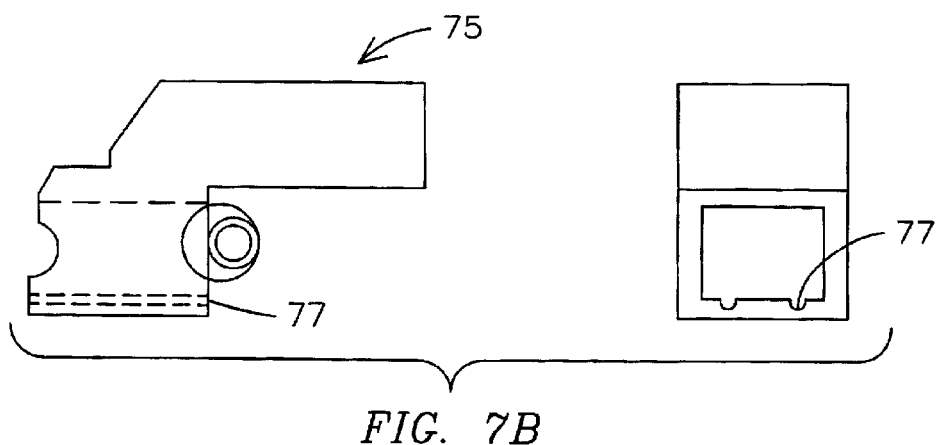

FIGS. 7A and 7B illustrate a third embodiment of the vacuum extraction system of the present invention. The vacuum extraction system includes brush holders having a vacuum passage provided through the brush holder, or along a side of an inner wall of the brush holder, to provide a passage through which contamination may be extracted. FIG. 7A illustrates a brush holder 70 with a passage 72 in the form of a through-hole in the body of the brush holder 70. The through-hole 72 may be formed, for example, by drilling or otherwise machining a hole through a conventional brush holder or by providing a hole in the body of the brush holder during the manufacturing of the brush holder. FIG. 7B illustrates a brush holder 75 with a passage 77 in the form of a groove along an inner wall of the body of the brush holder 75. The groove 77 may be formed by machining a groove in a conventional brush holder or by providing a grove in the body of the brush holder during manufacturing.

Figure 8:
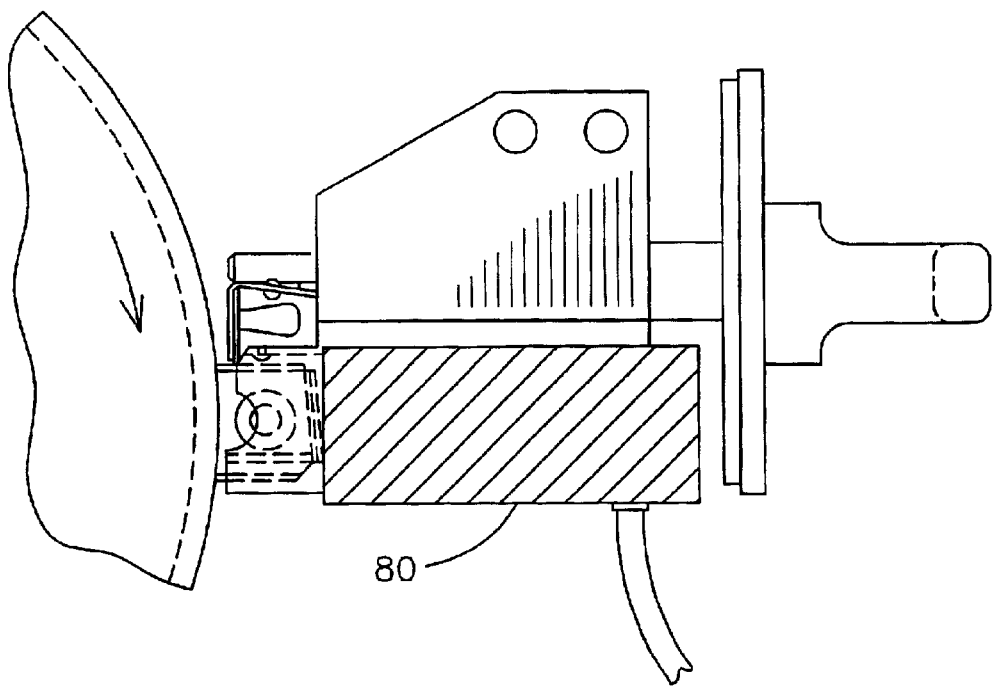
FIG. 8 illustrates a manifold consistent with the second and third embodiment of the present invention.

FIG. 8 illustrates a manifold 80 consistent with the second and third embodiments of the present invention. The manifold 80 provides a vacuum seal around the brush holder assembly and forms a vacuum connection from vacuum passages in the brushes and/or brush holders to the vacuum extraction system. The manifold 80 should be constructed of an anti-static, non-conductive material that is capable of withstanding the temperatures near 150 degrees Fahrenheit inside of the collector housing, such as polytetrafluoroethylene (PTFE). The manifold 80 may be secured to the brush holder assembly, for example, by forming the manifold 80 in the shape of the flexible, form-fitting boot that attaches to the brush holder module and forms a vacuum seal from the vacuum passages in the brushes and/or brush holders to the rest of the vacuum extraction system.

Although the above detailed description illustrates a vacuum extraction system consistent with the present invention in the context of a synchronous generator, it will be clear to one of skill in the art that the vacuum extraction system of the present invention may be applied to any rotating electrical device that utilizes wearable components. Thus, the scope of the invention should be determined by the appended claims and their legal equivalents, rather than by the examples given above.

I claim:

1. A vacuum extraction system for extracting dust from a current collection system, comprising:
    a brush holder assembly comprising a brush holder for holding a brush in sliding contact with a collector ring;
    a vacuum passage for extracting contaminants from said current collection system;
    a dust capture media in vacuum connection with said vacuum passage for capturing said contaminants; and
    a vacuum source in vacuum connection with said dust capture media for supplying vacuum to said vacuum extraction system.

2. The vacuum extraction system of claim 1 wherein said vacuum passage comprises a non-conductive vacuum nozzle mounted proximate said brush holder assembly for extracting dust generated by said sliding contact between said brush and said collector ring.

3. The vacuum extraction system of claim 1 wherein said vacuum passage comprises a through-hole in said brush.

4. The vacuum extraction system of claim 1 wherein said vacuum passage comprises a groove on a side of said brush.

5. The vacuum extraction system of claim 1 wherein said vacuum passage comprises a through-hole in said brush holder.

6. The vacuum extraction system of claim 1 wherein said vacuum passage comprises a groove on an inner side of said brush holder.

7. The vacuum extraction system of claim 1 further comprising a manifold for forming a sealed connection between said brush holder assembly and said vacuum extraction system.

8. A method of extracting contaminants from a current collection system utilizing a brush in sliding contact with a collector ring, comprising the steps of:
    providing a vacuum passage proximate the contact area between said brush and said collector ring;
    connecting said vacuum passage to a dust capture media via a vacuum connection;
    connecting said dust capture media to a vacuum source for providing a vacuum at said vacuum passage; and
    extracting said contaminants away from said contact area via said vacuum into said dust capture media.

9. The method of claim 8 wherein said step of providing a vacuum passage comprises providing a non-conductive vacuum nozzle mounted proximate said brush holder assembly for extracting dust generated by sliding contact between said brush and said collector ring.

10. The method of claim 8 wherein said step of providing a vacuum passage comprises providing a through-hole in said brush.

11. The method of claim 8 wherein said step of providing a vacuum passage comprises providing a groove on a side of said brush.

12. The method of claim 8 wherein said step of providing a vacuum passage comprises providing a through-hole in a brush holder for said brush.

13. The method of claim 8 wherein said step of providing a vacuum passage comprises providing a groove on an inner side of a brush holder for said brush.

14. A synchronous generator utilizing an excitation current from an exciter, comprising:
- a stator having stator windings,
- a rotor rotatables within said stator and having field windings for inducing a current in said stator windings,
- a current collection system for transferring said excitation current from said exciter to said field windings,
- a vacuum extraction system for extracting dust from said current collection system, said vacuum extraction system comprising
- a brush holder assembly comprising a brush holder for holding a brush in sliding contact with a collector ring;
- a vacuum passage for extracting air and contaminants from said current collection system;
- a dust capture media in vacuum connection with said vacuum passage for capturing contaminants from said air; and
- a vacuum source in vacuum connection with said dust capture media for supplying vacuum to said vacuum extraction system.

15. The synchronous generator of claim 14 wherein said vacuum passage comprises a high-temperature, non-conductive vacuum nozzle mounted proximate said brush holder assembly for extracting dust generated by sliding contact between said brush and said collector ring.

16. The synchronous generator of claim 14 wherein said vacuum passage comprises a through-hole in said brush.

17. The synchronous generator of claim 14 wherein said vacuum passage comprises a groove on a side of said brush.

18. The synchronous generator of claim 14 wherein said vacuum passage comprises a through-hole in said brush holder.

19. The synchronous generator of claim 14 wherein said vacuum passage comprises a groove on an inner side of said brush holder.

* * * * *